United States Patent [19]

Wong

[11] Patent Number: 4,857,254

[45] Date of Patent: Aug. 15, 1989

[54] METHOD FOR GRAFTING MONOMERS ONTO MOLTEN HYDROCARBON POLYMER

[75] Inventor: Chun S. Wong, Kingston, Canada

[73] Assignee: Du Pont Canada Inc., Mississauga, Canada

[21] Appl. No.: 158,676

[22] Filed: Feb. 22, 1988

[51] Int. Cl.[4] ............................................. B29C 47/36
[52] U.S. Cl. ............................... 264/211.24; 264/236; 264/347; 264/349; 525/193
[58] Field of Search ................. 264/176.1, 211.24, 78, 264/331.17–331.19, 236, 347, 349; 425/203, 204; 525/193

[56] References Cited

U.S. PATENT DOCUMENTS

| | | | |
|---|---|---|---|
| 3,511,896 | 5/1970 | Harmer | 264/236 |
| 3,862,265 | 1/1975 | Steinkamp et al. | 264/331.17 |
| 3,966,845 | 6/1976 | Van Brederode et al. | 264/331.18 |
| 4,612,155 | 9/1986 | Wong et al. | 264/176 R |

FOREIGN PATENT DOCUMENTS

| | | | |
|---|---|---|---|
| 907248 | 8/1972 | Canada . | |
| 993592 | 7/1976 | Canada . | |
| 1144681 | 12/1983 | Canada | 425/204 |
| 927501 | 11/1961 | United Kingdom | 425/204 |

OTHER PUBLICATIONS

Polymer Letters, vol. 10, pp. 95–100 (1972) "Alternating Copolymer Graft Copolymers v. 'Carboxylation' of Polymers by in situ Spontaneous Bulk Polymerization of Styrene–Maleic Anhydride Complex".

Primary Examiner—Jeffery Thurlow

[57] ABSTRACT

A method for the grafting of at least two different monomers onto molten hydrocarbon polymer, in which the monomers are capable of undergoing thermally induced copolymerization, is disclosed. The method involves contacting one of said monomers with the other of said monomers in the presence of molten polymer and under admixing conditions such that the monomers and polymer are rapidly admixed. In preferred embodiments, the process is operated in the absence of initiator for the grafting reaction and in the substantial absence of antioxidant in the polymer. Preferably, one of the grafting monomers is selected from the group consisting of styrene, 2-methyl styrene, 4-methyl styrene, alpha-methyl styrene, beta-methyl styrene, 4-vinyl anisole, stilbene and indene, and mixtures thereof, and the other of the grafting monomers is selected from the group consisting of maleic anhydride, itaconic anhdride, citraconic anhydride, maleimide and N-phenylmaleimide, and mixtures thereof. In emobodiments, the polymer is a homopolymer of ethylene, propylene or 4-methyl pentene-1, or a copolymer of ethylene and/or propylene with at least one of butene-1, hexene-1, 4-methyl pentene-1 and octene-1. The grafted polymers may be used in coatings, adhesives or the like, or in the form of film, moulded articles or the like.

3 Claims, No Drawings

METHOD FOR GRAFTING MONOMERS ONTO MOLTEN HYDROCARBON POLYMER

The present invention relates to a method for the grafting of monomers onto molten hydrocarbon polymer and especially to such a method in which (a) at least two different monomers are grafted onto the polymer and (b) such monomers are capable of undergoing thermally-induced copolymerization.

Polyolefins, especially homopolymers of ethylene or propylene and copolymers of ethylene and higher alpha-olefins, are used in large volumes for a wide variety of end uses, for example, in the form of film, fibres, moulded or thermoformed articles, pipe, coatings and the like.

Homopolymers and copolymers of hydrocarbon alpha-olefins are non-polar polymers, especially when compared with polyamides, polyesters and the like. The non-polar nature of such polymers has a major influence on polymer properties, which may be very beneficial but in some instances results in potential problems or difficulties in the use of the polymers. For example coatings, stabilizers and dyes tend to be polar in nature, with little affinity for non-polar polymers, and thus tend to exhibit poor adhesion, retention or absorption properties with polyolefins. A variety of techniques have been developed to overcome such problems or difficulties, including treatment of the polymers with a corona discharge, changing the structure of additives, blending with polar materials and grafting of polar monomers onto the polymers.

A number of methods have been developed for the grafting of monomers onto hydrocarbon polymers. For instance, the grafting of monomers onto molten polymers is known e.g. as described in U.S. Pat. No. 4 612 155 of R. A. Zelonka and C. S. Wong, which issued Sept. 16, 1986. A process in which a mixture of styrene and maleic anhydride is formed and then reacted with a polymer having active hydrogen atoms at a temperature above about 120° C. is disclosed in Canadian Patent 907 248 of N. G. Gaylord, which issued Aug. 8, 1972. A similar process is also disclosed by N. G. Gaylord et al. in Polymer Letters Vol. 10, pp 95–100 (1972). A process for modifying rheological or chemical and rheological properties of a polymer in which monomers are grafted on to a polymer in an extruder is disclosed in Canadian Patent 993 592 of R. A. Steinkamp et al., which issued July 20, 1976.

In those instances in which two or more monomers are to be grafted onto a polymer, difficulties may be experienced in operating such a grafting process in a continuous manner. Moreover, it is common practice to conduct grafting reactions in the presence of an initiator that facilitates reaction between the monomers and the polymers.

A method has now been found in which at least two monomers capable of undergoing thermally-induced copolymerization may be grafted onto hydrocarbon polymers, especially in the absence of an initiator.

Accordingly, the present invention provides a method for the preparation of a graft polymer comprising the steps of:

(a) feeding a polymer to an extruder and conveying the polymer, in a molten condition, through the extruder, said polymer being a hydrocarbon polymer of monomers having 2–10 carbon atoms;

(b) feeding at least two grafting monomers to the extruder, said grafting monomers being capable of undergoing thermally-induced copolymerization at a temperature lower than the temperature of the hydrocarbon polymer in said extruder, said grafting monomers being fed to the extruder such that one of said grafting monomers is contacted with the other of said grafting monomers in the presence of molten polymer and under admixing conditions such that polymer and grafting monomers are rapidly admixed;

(c) rapidly admixing said monomers and polymer for a period of at least ten seconds; and (d) extruding the resultant modified polymer from the extruder.

In a preferred embodiment of the method of the present invention, the preparation of the graft polymer is carried out in the absence of an added initiator for the grafting reaction.

In another embodiment, the polymer is a hydrocarbon polymer having tertiary carbon atoms.

In a further embodiment, one of the grafting monomers is selected from the group consisting of styrene, 2-methyl styrene, 4-methyl styrene, alpha-methyl styrene, beta-methyl styrene, 4-vinyl anisole, stilbene and indene, and mixtures thereof, and the other of the grafting monomers is selected from the group consisting of maleic anhydride, itaconic anhydride, citraconic anhydride, maleimide and N-phenylmaleimide, and mixtures thereof.

The present invention relates to the grafting of certain monomers onto a hydrocarbon polymer. The hydrocarbon polymer is a polymer of at least one hydrocarbon alpha-olefin having 2–10 carbon atoms. In particular, the polymer is a homopolymer of ethylene, propylene or 4-methyl pentene-1, or a copolymer of ethylene and/or propylene with at least one of butene-1, hexene-1, 4-methyl pentene-1 and octene-1. It is preferred that the polymer contain tertiary carbon atoms. The polymer may be a thermoplastic partially crystalline polymer or an elastomer, provided that the polymer is capable of being extruded through an extruder.

Antioxidants, if present in the polymer, may inhibit thermally induced copolymerization and/or grafting of the monomers admixed with the polymer. Thus, it is preferred that the polymer contain less than 150 ppm, and especially less than 75 ppm of antioxidant. In preferred embodiments, the polymer is substantially free of antioxidant.

At least two monomers are fed to the extruder Such monomers are monomers that are capable of undergoing thermally-induced copolymerization. The monomers are fed to the extruder in a manner that is not conducive to copolymerization of the monomers prior to admixing of monomers and polymers. Such copolymerization would tend to lead to processing problems e.g. blocking of the lines feeding monomers to the extruder and/or of the injection port in the extruder, as is illustrated hereinafter.

Of the monomers fed to the extruder, at least one of the monomers is preferably selected from styrene, 2-methyl styrene, 4-methyl styrene, alpha-methyl styrene, beta-methyl styrene, 4-vinyl anisole, stilbene and indene, and mixtures thereof. Styrene is the preferred monomer. It is preferred that such monomer be fed directly into the molten polymer in the extruder, rather than admixing with polymer e.g. in the form of pellets or granules, prior to being fed to the extruder.

The other monomer is preferably selected from maleic anhydride, itaconic anhydride, citraconic anhydride, maleimide and N-phenylmaleimide, and mixtures thereof. Such monomer may be fed directly into the molten polymer, separately from the other monomer, or the monomer may be admixed with polymer prior to being fed to the extruder. For example, the monomer may be dry blended with the polymer i.e. in the form of a physical admixture of monomer and polymer, or coated onto the polymer or be in the form of a composition of monomer and a polymer compatible with the polymer that is to be grafted and capable of readily being blended therewith. For example, such compatible polymer may be a polymer similar to the polymer to be grafted but having a shear viscosity that is not more than 30% of that of the polymer to be grafted, shear viscosity being measured at 200° C. and at a shear rate of 400 sec-1. Such compatible polymer should also be a hydrocarbon polymer, but the compatible polymer may be another polymer that does not deleteriously affect the grafting process.

The method of the present invention is intended to be operated as a continuous process. In the method, polymer is fed to an extruder equipped with a suitable mixing screw. In preferred embodiments, the extruder is a twin-screw extruder. As discussed above, one or both of the monomers may be admixed with the polymer fed to the extruder. Alternatively, the monomers may be simultaneously but separately fed to the extruder. For example, the monomers may be simultaneously fed to the same section of the extruder e.g. using concentric tubes, one tube being for each monomer, that do not permit admixing of the monomers prior to the contacting of monomer and polymer. However, it is important that the monomers not be admixed together and fed to an injection port on an extruder.

The temperature of admixing of polymer and monomer is above the melting point of the polymer and would normally be in the range of 150°–280° C. The hold-up time of polymer in the extruder, after admixing with all monomers will be inversely related to the temperature of the polymer but should be at least 10 seconds, and preferably at least 30 seconds.

The grafted polymer is extruded from the extruder in any convenient shape. For example, the grafted polymer may be fabricated directly into an article e.g. film, fibre or moulded article. However, the grafted polymer will usually be extruded and formed into a comminuted shape e.g. pellets, granules or the like, suitable for use in the fabrication of an article.

The grafted polymers may b used in a variety of end-uses e.g. coatings, films, fibres, moulded articles or the like, especially end-uses in which dyeability, adhesion and/or printability is an important property.

The present invention is illustrated by the following examples.

EXAMPLE I

A powdered homopolymer of propylene that did not contain antioxidant, obtained from Himont Canada Inc. as PRO-FAX 6401 and having a melt flow index of 4 dg/min, was coated with 1.1% by weight of maleic anhydride. The coated powder thus obtained was extruded through a Werner & Pfleiderer 53 mm twin screw extruder equipped with a vent port and an efficient mixing screw. The temperature profile was as follows: zone 1, 170° C.; zone 2, 188° C.; zone 3 230° C.; zone 4, 230° C.; and die, 230° C. The extrusion rate was 30 kg/hr. 1.4% by weight of styrene was injected through a vent port located in zone 2. The grafted polymer obtained was pelletized.

The grafted polymer contained both styrene and maleic anhydride, the amount of the latter being 0.8% by weight of the polymer. The grafted polymer was off-white in colour and had a melt flow index of 17.3 dg/min. In a comparative run, the polymer was extruded and pelletized under the same conditions but without addition of maleic anhydride and/or styrene; the resultant pellets had a melt flow index of 20.0 dg/min.

The grafted polymer was readily dyeable under basic conditions using a blue dye. In addition, in an adhesion test in which polymer is melt pressed to aluminum at a temperature of 190° C., the grafted polymer exhibited improved adhesion to aluminum foil, compared with un-grafted polymer.

EXAMPLE II

In a comparative example, powdered polymer was coated with 1.1% by weight of maleic anhydride and 500 ppm of Lupersol 130 organic peroxide. The resultant coated powder was subjected to the procedure of Example I, without addition of styrene. The resultant grafted polymer contained 0.15% by weight of grafted maleic anhydride, had a melt flow index of 258 dg/min and was off-white in colour. Adhesion of the grafted polymer to aluminum was poor. The grafted polymer was dyeable but to a colour less intense than that obtained in Example I.

EXAMPLE III

Twenty five kilograms of a pelletized homopolymer of propylene (Shell E-300) containing about 600 ppm of Irganox 1010 hindered phenolic antioxidant and about 1000 ppm of Irgafos 168 phosphite antioxidant, with a melt flow index of 4 dg/min was coated with 1.2% by weight of maleic anhdyride. The coated powder thus obtained was subjected to the procedure of Example I, with 1.5% by weight of styrene being injected at the vent port.

The "grafted" polymer obtained contained less than 0.05% by weight of grafted maleic anhydride and had a melt flow index of 5.2 dg/min.

This example illustrates the adverse effect of the presence of antioxidant in the polymer.

EXAMPLE IV

In a comparative experiment, 403 g of maleic anhydride that had previously been purified by vacuum distillation were dissolved in 473 ml of styrene by admixing and then gently warming using a water bath at 60°–70° C. The resultant solution was then placed in a storage tank equipped with a stainless steel coil through which water at 60° C. was circulated.

A grafting reaction was attempted by injecting this solution through a jacketed stainless steel transfer line into a vent port of a Brabender extruder; at the same time a linear low density polyethylene (density 0.920 g/cm$^3$, melt index 1.4 dg/min) was extruded using the extruder. After a couple of hours, the transfer line became plugged with styrene/maleic anhydride copolymer that had formed in the storage tank.

EXAMPLE V

The experiment of Example IV was repeated except that the solution of styrene and maleic anhydride was maintained at 45°–50° C. in an attempt to reduce the amount of copolymerization in the solution After about an hour, maleic anhydride precipitated from the solution, resulting in plugging of the transfer line.

From Examples IV and V, it will be noted that maintaining the solution of styrene and maleic anhydride at 60° C. resulted in copolymerization of the monomers whereas maintaining the solution at 45°–50° C. resulted in precipitation of maleic anhydride. Thus, forming a solution of the monomers and feeding that solution to an extruder is not a practical method for the grafting of styrene and maleic anhydride onto polyethylene.

EXAMPLE VI

The monomer addition system used in the experiment of Example IV was modified by maintaining the styrene and maleic anhydride in separated storage tanks instead of as a solution. The tank containing maleic anhydride was warmed with recirculating water at a temperature of 70° C., while the tank containing styrene remained at ambient temperature. Streams from each tank were admixed together immediately prior to being fed to the injection port on the extruder; the temperature of the injection port was at least 175° C. It was found that the injection port on the extruder became plugged within about two hours. The apparatus was dis-assembled and it was found that styrene and maleic anhydride had copolymerized at the injection port, thereby further illustrating the importance of admixing the monomers in the presence of molten polyethylene.

EXAMPLE VII

In a further comparative experiment, 160 g of styrene/maleic anhydride copolymer obtained from ARCO Chemical Company as SMA 1000 was dry blended with 8 kg of a linear low density polyethylene (density 0.920 g/cm$^3$, melt index 1.4 dg/min) in powdered form. The resultant admixture was extruded through a twin screw extruder using a melt temperature of 240° C., a screw speed of 120 rpm and a throughput of 15 lb/hr. The product obtained contained 0.4% of anhydride material that was not extractable with acetone, but the product exhibited poor adhesion to aluminum in the test described above.

EXAMPLE VIII

To illustrate the use of "dry" blends in a process of the present invention, a linear low density polyethylene (density 0.920 g/cm$^3$, melt index 1.4 dg/min) in powdered form was dry blended with 2% by weight of each of styrene and maleic anhydride; the styrene was absorbed into the polymer. The resultant blend was fed into a Brabender extruder and extruded at a rate of 7.8 g/min. The temperatures in the extruder were set as follows: zone 1, 170° C.; zone 2, 230° C.; zone 3, 230° C.; and die, 203° C. The screw speed was 30 rpm. Analysis of the product obtained showed that about 1% of each of maleic anhydride and styrene had been grafted onto the polyethylene. The grafted polymer exhibited good adhesion to aluminum.

The procedure described above was repeated using a high density polyethylene having a density of 0.960 g/cm$^3$ and a melt index of 1.0 dg/min. The resultant product contained grafted styrene and maleic anhydride, the latter being 0.9% by weight.

EXAMPLE IX

To illustrate the present invention using injection of styrene into the extruder, a high density polyethylene (density 0.956 g/cm$^3$, melt index 1.0 dg/min) in ground form was admixed with 1.5% by weight of ground maleic anhydride powder. The resultant admixture was extruded through a Brabender extruder equipped with a venting screw and an extension on the extruder so that the residence time of the polymer in the extruder was about 3 minutes. Styrene was injected directly into the extruder to provide a concentration of 2% by weight in the admixture. The temperatures in the extruder were as follows: zone 1, 150° C.; zone 2, 180° C.; zone 3, 200° C.; extension to the extruder, 200° C.; and die, 195° C. The screw speed was 106 rpm and the throughput was 40 g/min. The product obtained was then re-extruded under the same conditions in order to improve the homogeneity of the product.

The product contained styrene and maleic anhydride (0.73% by weight) grafted onto the polyethylene.

EXAMPLE X

A grafting process of the present invention was carried out using a linear low density polyethylene (density 0.920 g/cm$^3$, melt index 1.4 dg/min) and a 5 cm Royle single screw extruder with a screw designed to provide intensive mixing. One percent by weight of each of styrene and maleic anhydride were introduced directly into the extruder using concentrically mounted tubes; styrene was passed through the inner tube and maleic anhydride was passed through the outer tube which was heated so as to maintain the maleic anhydride in a molten condition. The concentric tubes were located so that the styrene and maleic anhydride were admixed together at essentially the same time as contact was made with the molten polymer. The melt temperature of the admixture in the extruder was maintained at 220°–240° C. and the throughput was 12 kg/hr.

The resultant styrene/maleic anhydride grafted polyethylene contained 0.56% by weight of maleic anhydride.

This process was operated over a period of several days without the process being interrupted because of plugging of the injection port.

I claim:
1. A method for the preparation of a graft polymer in the absence of an initiator, comprising the steps of:
  (a) feeding one polymer selected from the group consisting of homopolymers of ethylene and propylene and copolymers of ethylene or of propylene with at least one of butene-1, hexene-1, 4-methyl pentene-1, and octene-1 to an extruder and conveying the polymer, in a molten condition, through the extruder;
  (b) feeding two grafting monomers, one monomer being styrene and the other monomer being maleic anhydride, to the extruder, said grafting monomers being capable of undergoing thermally-induced copolymerization at a temperature lower than the temperature of the starting polymer in said extruder, said grafting monomers being fed to the extruder such that one of said grafting monomers is contacted with the other of said grafting monomers in the presence of molten polymer and under admixing conditions such that the polymer and grafting monomers are rapidly admixed;
  (c) rapidly admixing said monomers and polymer for a period of at least ten seconds; and
  (d) extruding the resultant modified polymer from the extruder.

2. The method of claim 1 in which the polymer is substantially-free of antioxidant.

3. The method of claim 1 in which the monomers and polymer are admixed for a period of at least 30 seconds.

* * * * *